United States Patent
Langenfeld et al.

(10) Patent No.: US 9,644,514 B1
(45) Date of Patent: May 9, 2017

(54) EXHAUST SYSTEMS FOR MARINE PROPULSION DEVICES HAVING SEALING ARRANGEMENTS

(71) Applicant: Brunswick Corporation, Lake Forest, IL (US)

(72) Inventors: Gregg D. Langenfeld, Fond du Lac, WI (US); David J. Hilbert, Black Creek, WI (US); Timothy S. Reid, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 180 days.

(21) Appl. No.: 14/794,967

(22) Filed: Jul. 9, 2015

(51) Int. Cl.
  *F01N 3/10* (2006.01)
  *B01D 53/94* (2006.01)
  *F01N 3/02* (2006.01)

(52) U.S. Cl.
  CPC ............... *F01N 3/10* (2013.01); *B01D 53/94* (2013.01); *F01N 3/0205* (2013.01)

(58) Field of Classification Search
  CPC ........ B63H 20/24; B63H 20/48; B63H 20/00; F01N 3/04
  USPC ........ 440/89 H, 89 B; 60/298, 299, 302, 313
  See application file for complete search history.

(56) References Cited

U.S. PATENT DOCUMENTS

| | | | |
|---|---|---|---|
| 5,306,185 A | 4/1994 | Lassanske et al. | |
| 6,511,355 B1 * | 1/2003 | Woodward | F01N 3/04 440/89 C |
| 6,662,555 B1 | 12/2003 | Ishii | |
| 7,704,111 B2 | 4/2010 | Ito et al. | |
| 7,867,048 B2 * | 1/2011 | Ochiai | F01N 13/004 440/89 F |
| 7,954,314 B1 | 6/2011 | Bruestle et al. | |
| 8,038,493 B1 | 10/2011 | Broman et al. | |
| 8,298,026 B2 | 10/2012 | Ochiai | |
| 8,402,930 B1 | 3/2013 | Taylor et al. | |
| 8,444,447 B2 | 5/2013 | Ochiai | |
| 8,479,691 B1 | 7/2013 | Taylor et al. | |
| 8,500,501 B1 | 8/2013 | Taylor et al. | |
| 8,540,536 B1 | 9/2013 | Eichinger et al. | |
| 8,696,394 B1 | 4/2014 | Langenfeld et al. | |

(Continued)

OTHER PUBLICATIONS

U.S. Appl. No. 14/543,458, filed Nov. 17, 2014, unpublished.
U.S. Appl. No. 14/521,797, filed Oct. 23, 2014, unpublished.
U.S. Appl. No. 14/543,453, filed Nov. 17, 2014, unpublished.

*Primary Examiner* — Tom P Duong
(74) *Attorney, Agent, or Firm* — Andrus Intellectual Property Law, LLP

(57) ABSTRACT

An exhaust system is for a marine propulsion device having an internal combustion engine. The exhaust system comprises a catalyst housing having a housing inlet end that receives exhaust gas flow from the internal combustion engine and an opposite, housing outlet end that discharges the exhaust gas flow. A catalyst is disposed in the catalyst housing. An outlet collector receives the exhaust gas flow from the catalyst housing. The outlet collector comprises a collector inlet end that is engaged with the housing outlet end. One of the collector inlet end and housing outlet end overlaps with the other of the collector inlet end and housing outlet end at a joint. A seal is disposed at the joint between the collector inlet end and the housing outlet end. The joint is devoid of a cooling water jacket.

23 Claims, 6 Drawing Sheets

(56) References Cited

U.S. PATENT DOCUMENTS

| | | |
|---|---|---|
| 8,763,566 B1 | 7/2014 | Taylor et al. |
| 8,783,217 B1* | 7/2014 | Taylor et al. |
| 9,359,058 B1* | 6/2016 | Langenfeld ............ B63H 20/24 |
| 2008/0166935 A1 | 7/2008 | Ito et al. |
| 2014/0242859 A1* | 8/2014 | Ochiai ................... B63H 20/28 |
| | | 440/88 M |

* cited by examiner

EXHAUST SYSTEMS FOR MARINE PROPULSION DEVICES HAVING SEALING ARRANGEMENTS

FIELD

The present disclosure relates to exhaust systems and methods of making exhaust systems for marine propulsion devices having an internal combustion engine.

BACKGROUND

The following U.S. Patents and Patent Applications are incorporated herein by reference, in entirety.

U.S. patent application Ser. No. 14/521,797 discloses a marine propulsion device having an internal combustion engine that discharges exhaust gases, a driveshaft housing that is located vertically below the engine, and a catalyst that is sandwiched between opposing castings of the device that face each other at a split-line. The exhaust gases flow through the catalyst parallel to the split-line.

U.S. patent application Ser. No. 14/543,453 discloses an outboard marine propulsion device that comprises an internal combustion engine having a cylinder head and a cylinder block, and an exhaust manifold that discharges exhaust gases from the engine towards a vertically extending catalyst housing. The exhaust manifold has a plurality of horizontally extending inlet runners that receive the exhaust gases from the engine, and a vertically extending collecting passage that conveys the exhaust gases from the plurality of horizontally extending inlet runners to a bend that redirects the exhaust gases downwardly towards the catalyst housing.

U.S. Patent Application Publication No. 2008/0166935 discloses an outboard motor that includes a multi-cylinder engine which includes cylinders longitudinally oriented and vertically paralleled in a cylinder block, a cylinder head arranged at a rearward position of the cylinder blocks, and a crankcase arranged at a forward position of the cylinder block, the cylinder head having an outlet of an exhaust port at one side thereof. An exhaust system for the outboard motor includes an exhaust manifold which communicates the outlet of the exhaust port with an exhaust outlet opening, the exhaust manifold including a first exhaust gas passage extending in a vertical direction for gathering exhaust gas discharged from the outlet of each exhaust port and a second exhaust gas passage extending in a vertical direction adjacently to the first exhaust gas passage. A catalyst unit is provided on the way of the second exhaust gas passage.

U.S. Pat. No. 8,444,447 discloses an outboard motor that includes an engine, an exhaust guide, and a catalyst. The engine includes a cylinder and crankshaft. The crankshaft is disposed along a vertical direction. The exhaust guide is arranged to support the engine from below. The catalyst is disposed in an interior of the engine. The engine includes a cylinder body. The cylinder body includes a housing portion arranged to house the catalyst. The cylinder body includes a first exhaust passage that includes an interior of the housing portion. The catalyst is inserted into the housing portion from below and is sandwiched from above and below by the housing portion and the exhaust guide.

U.S. Pat. No. 8,298,026 discloses an outboard motor that includes an engine, an exhaust guide, and a catalyst. The engine includes a cylinder and crankshaft. The crankshaft is disposed along a vertical direction. The exhaust guide is arranged to support the engine from below. The catalyst is disposed in an interior of the engine. The engine includes a cylinder body. The cylinder body includes a housing portion arranged to house the catalyst. The cylinder body includes a first exhaust passage that includes an interior of the housing portion. The catalyst is inserted into the housing portion from below and is sandwiched from above and below by the housing portion and the exhaust guide.

U.S. Pat. No. 8,038,493 discloses a catalyzed exhaust system for an outboard motor engine that locates its catalyst device in a catalyst housing above an adapter plate which supports the engine and separates it from the driveshaft housing. The exhaust gas is directed initially in an upwardly direction and then is turned downwardly to provide space for location and easy access to the catalyst device. A coolant, such as water drawn from a body of water, is reversed in direction of flow several times in order to advantageously fill certain cooling channels in an upward direction. In addition, various coolant channels are vented to remove potential pockets of air in their upper regions.

U.S. Pat. No. 7,954,314 discloses an engine with a cavity so that a catalyst member can be contained within the engine when an engine head portion is attached to an engine block portion. This attachment of the engine head portion and engine block portion, which forms the engine structure, captivates the catalyst member within the cavity without the need for additional brackets and housing structures. The cavity is preferably located above or at the upper regions of first and second exhaust conduits which direct exhaust upwardly from the engine head portion toward the cavity and downwardly from the cavity within the engine block portion. The first and second exhaust conduits are preferably formed as integral structures within the engine head portion and engine block portion.

U.S. Pat. No. 7,704,111 discloses an outboard motor that includes a multi-cylinder engine which includes cylinders longitudinally oriented and vertically paralleled in a cylinder block, a cylinder head arranged at a rearward position of the cylinder blocks, and a crankcase arranged at a forward position of the cylinder block, the cylinder head having an outlet of an exhaust port at one side thereof. An exhaust system for the outboard motor includes an exhaust manifold which communicates the outlet of the exhaust port with an exhaust outlet opening, the exhaust manifold including a first exhaust gas passage extending in a vertical direction for gathering, exhaust gas discharged from the outlet of each exhaust port and a second exhaust gas passage extending in a vertical direction adjacently to the first exhaust gas passage, and a catalyst unit is provided on the way of the second exhaust gas passage.

U.S. Pat. No. 6,662,555 discloses a catalyzer arrangement for an engine that includes an improved construction that does not require a large space for furnishing a relatively large volume catalyzer. The engine is surrounded by a protective cowling. A cylinder body of the engine has a plurality of cylinder bores spaced apart from each other. The engine also has an exhaust manifold to gather exhaust gases from the respective cylinder bores. An exhaust passage is coupled to the manifold and extends, at least in part, within a space defined between a side surface of the cylinder body and the protective cowling. At least one catalyzer is disposed in the exhaust passage.

U.S. Pat. No. 6,511,355 discloses a catalyst exhaust system that includes a catalyst housing having an inlet end, an outlet end, and a passage there through. The outlet end includes a valve seat, and a water jacket surrounds the catalyst housing. A valve housing is in flow communication with the outlet end and in flow communication with said water jacket to accommodate a valve configured to allow passage of exhaust gases but prevent water front entering the catalyst housing passage and reaching a catalyst therein.

U.S. Pat. No. 5,306,185 discloses a marine propulsion device comprising a propulsion unit including a propeller shaft, a housing including an exhaust gas inlet and an exhaust gas outlet, a catalytic element supported in the housing for reorientation from a first orientation to a second orientation different from the first orientation, and structure for reorienting the element from the first orientation to the second orientation.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, an exhaust system is for a marine propulsion device having an internal combustion engine. The exhaust system comprises a catalyst housing having a housing inlet end that receives exhaust gas flow from the internal combustion engine and an opposite, housing outlet end that discharges the exhaust gas flow. A catalyst is disposed in the catalyst housing. An outlet collector receives the exhaust gas flow from the catalyst housing. The outlet collector comprises a collector inlet end that is engaged with the housing outlet end. One of the collector inlet end and housing outlet end overlaps with the other of the collector inlet end and housing outlet end at a joint. A seal is disposed at the joint between the collector inlet end and the housing outlet end. The joint is devoid of a cooling water jacket. An outlet collector cooling water jacket is on the outlet collector. A catalyst housing cooling water jacket is on the catalyst housing. At least one bypass conduit conveys cooling water from one of the outlet collector cooling water jacket and catalyst housing cooling water jacket to the other of the outlet collector cooling water jacket and catalyst housing cooling water jacket. A cooling water pump pumps cooling water through the outlet collector cooling, water jacket, at least one bypass conduit, and catalyst housing cooling water jacket.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
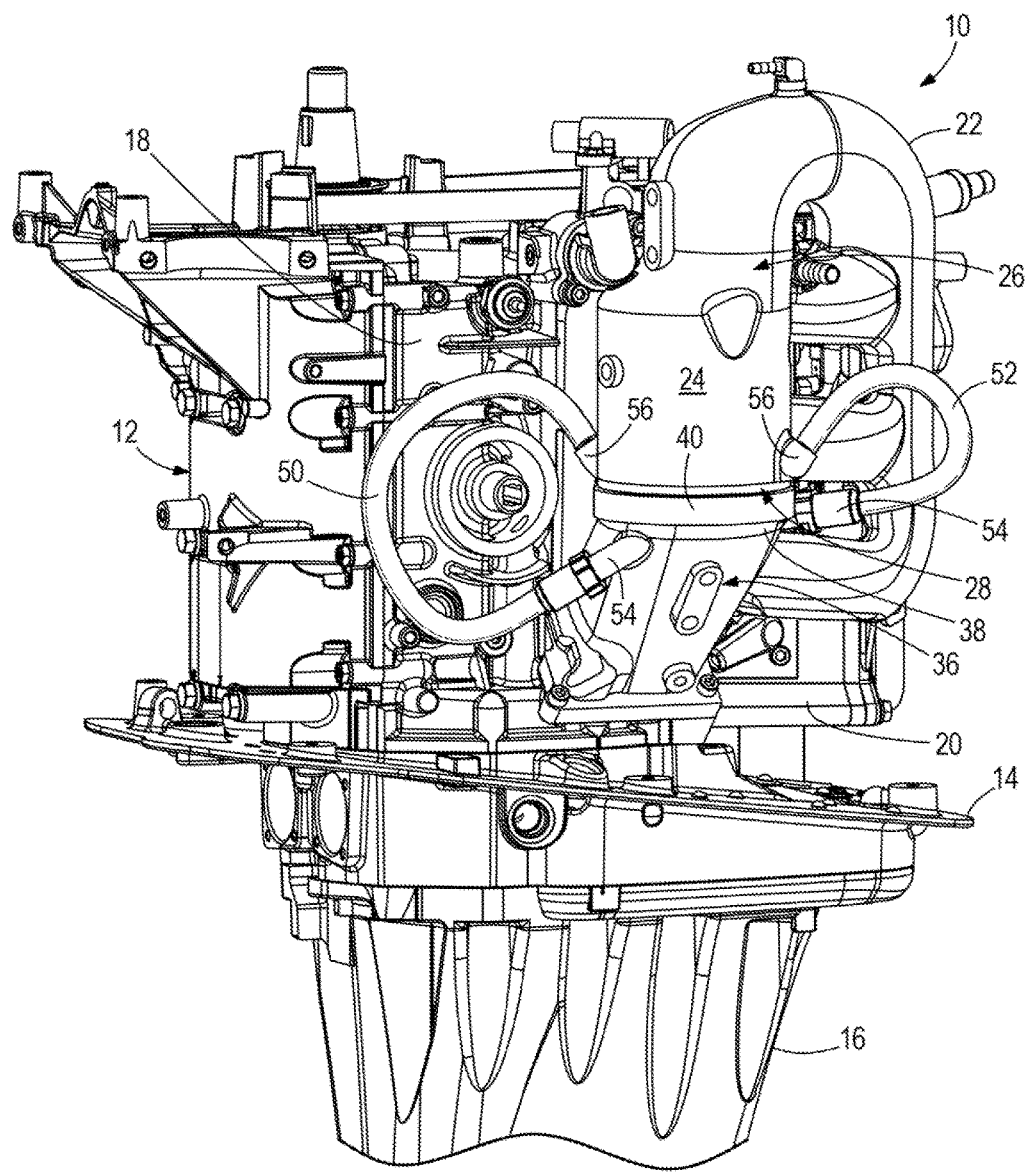
FIG. 1 is a perspective view of portions of an outboard marine propulsion device including an internal combustion engine that is supported on an adapter plate.

FIG. 1 is a perspective view of portions of art outboard marine propulsion device 10 having an internal combustion engine 12 that is supported on an adapter plate 14. An oil sump 16 extends below the adapter plate 14, as is conventional. The outboard marine propulsion device 10 includes an engine block 18 and a cylinder head 20. An exhaust manifold 22 is attached to the internal combustion engine 12 and receives exhaust gas flow from the internal combustion engine 12 and conveys the exhaust gas flow ultimately for discharge from the outboard marine propulsion device 10.

As shown in FIGS. 1-4, a catalyst housing 24 is attached to the exhaust manifold 22 and receives the exhaust gas flow from the exhaust manifold 22. The catalyst housing 24 has a housing inlet end 26 that receives the exhaust gas flow and an opposite, housing outlet end 28 that discharges the exhaust gas flow. The catalyst housing 24 can reside in the engine block 16 or cylinder head 20 or in a separate exhaust component. A catalyst 30 is disposed in the catalyst housing 24 and is configured to treat the exhaust gases in a conventional manner. The catalyst 30 has an upstream catalyst inlet end 32 that receives the untreated exhaust gas flow and an opposite, downstream catalyst outlet end 34 that discharges the treated exhaust gas flow.

An outlet collector 36 is connected to the catalyst housing 24 and receives the exhaust gas flow from the catalyst housing 24. The outlet collector 36 has as collector inlet end 38 that is engaged with the housing outlet end 28. In the illustrated example, the collector inlet end 38 has a radially inner diameter that is slightly larger than the radially outer diameter of the housing outlet end 28. The collector inlet end 38 overlaps the housing outlet end 28 at a joint 40. A seal 42, in the illustrated example is an O-ring seal, is disposed at the joint 40 between the collector inlet end 38 and the housing outlet end 28. The seal 42 prevents exhaust gas flow past the joint 40 between the collector inlet end 38 and the housing outlet end 28. It will be recognized by those having ordinary skill in the art that in other examples the collector inlet end 38 can have a radially outer diameter that is smaller than a radially inner diameter the housing outlet end 28. In such examples, the housing outlet end 28 would overlap the collector inlet end 38 at the joint 40.

Figure 2:
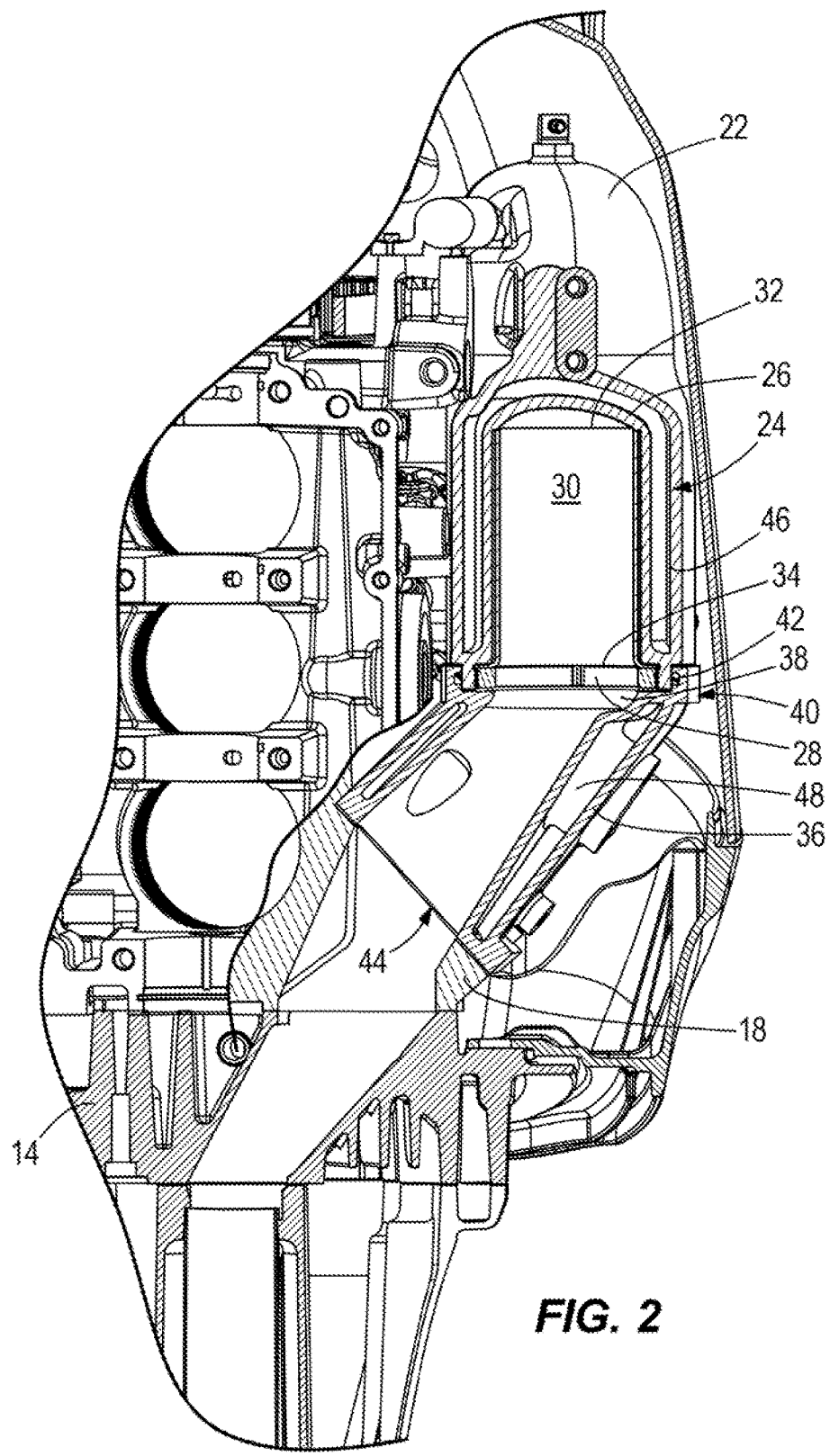
FIG. 2 is a view of section 2-2 taken in FIG. 1.
Figure 3:
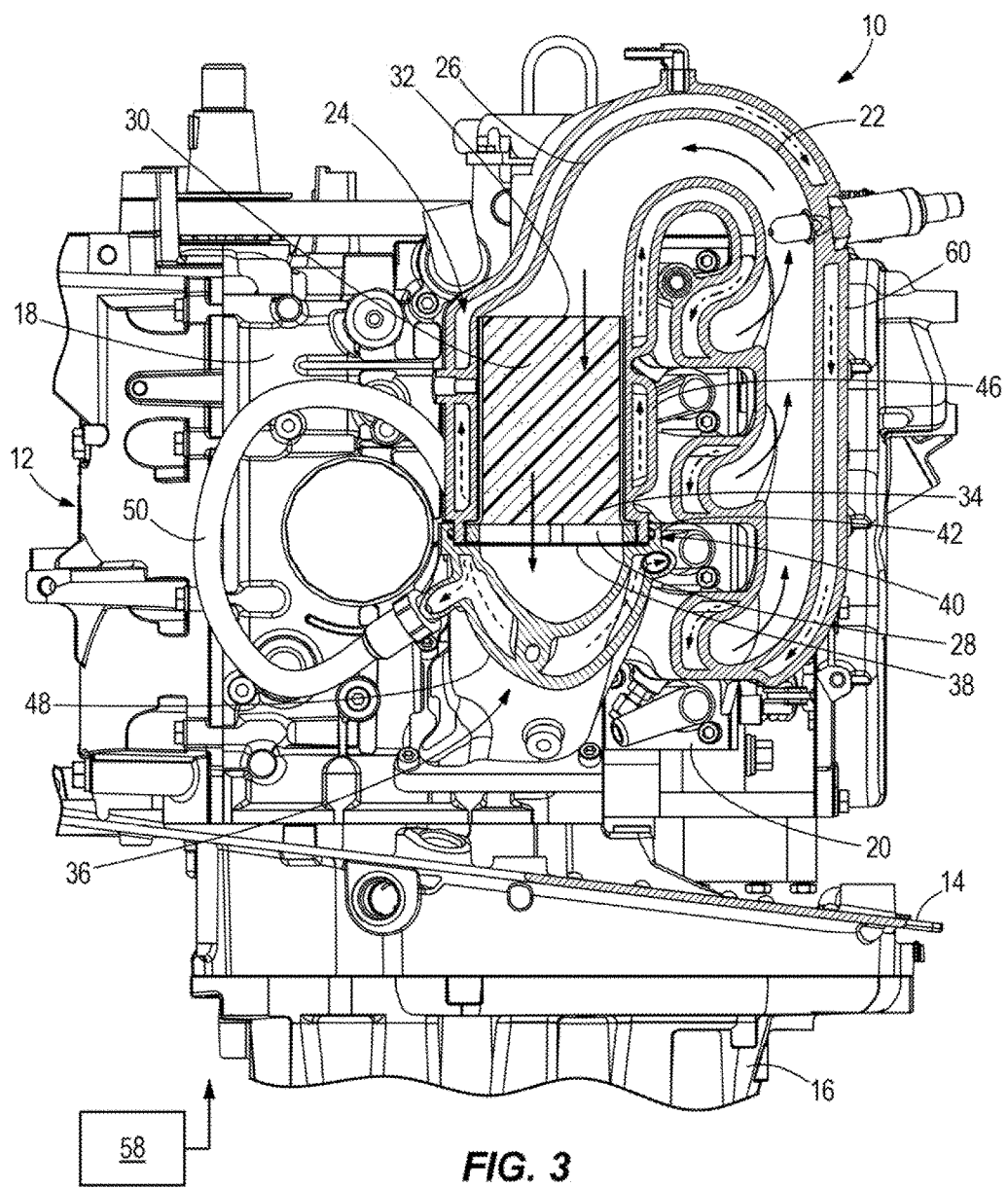
FIG. 3 is a view of section 3-3 taken in FIG. 1.

As shown in FIG. 2, the downstream catalyst outlet end 34 is located upstream of the joint 40, as shown in FIG. 3. The outlet collector 36 further includes a collector outlet end 44 that discharges the exhaust gases to the engine block 18 of the internal combustion engine 12. The outlet collector 36 could be integral to the engine block 18 or adapter plate 14 or connect to the adapter plate 14 for example as a separate member.

As shown in FIGS. 2-3, a catalyst housing cooling water jacket 46 is disposed on the catalyst housing 24. An outlet collector cooling water jacket 48 is disposed on the outlet collector 36. The outlet collector cooling water jacket 48 extends upwardly to the beginning, of the noted joint 40. The catalyst housing cooling water jacket 46 also extends downwardly to the beginning, of the noted joint 40, on an opposite side thereof with respect to the outlet collector cooling water jacket 48. The joint 40 is devoid of a cooling water jacket. En other words, the radially outer periphery of the joint 40 does not have a cooling water jacket and thus is not water-cooled in the radial direction.

Figure 4:
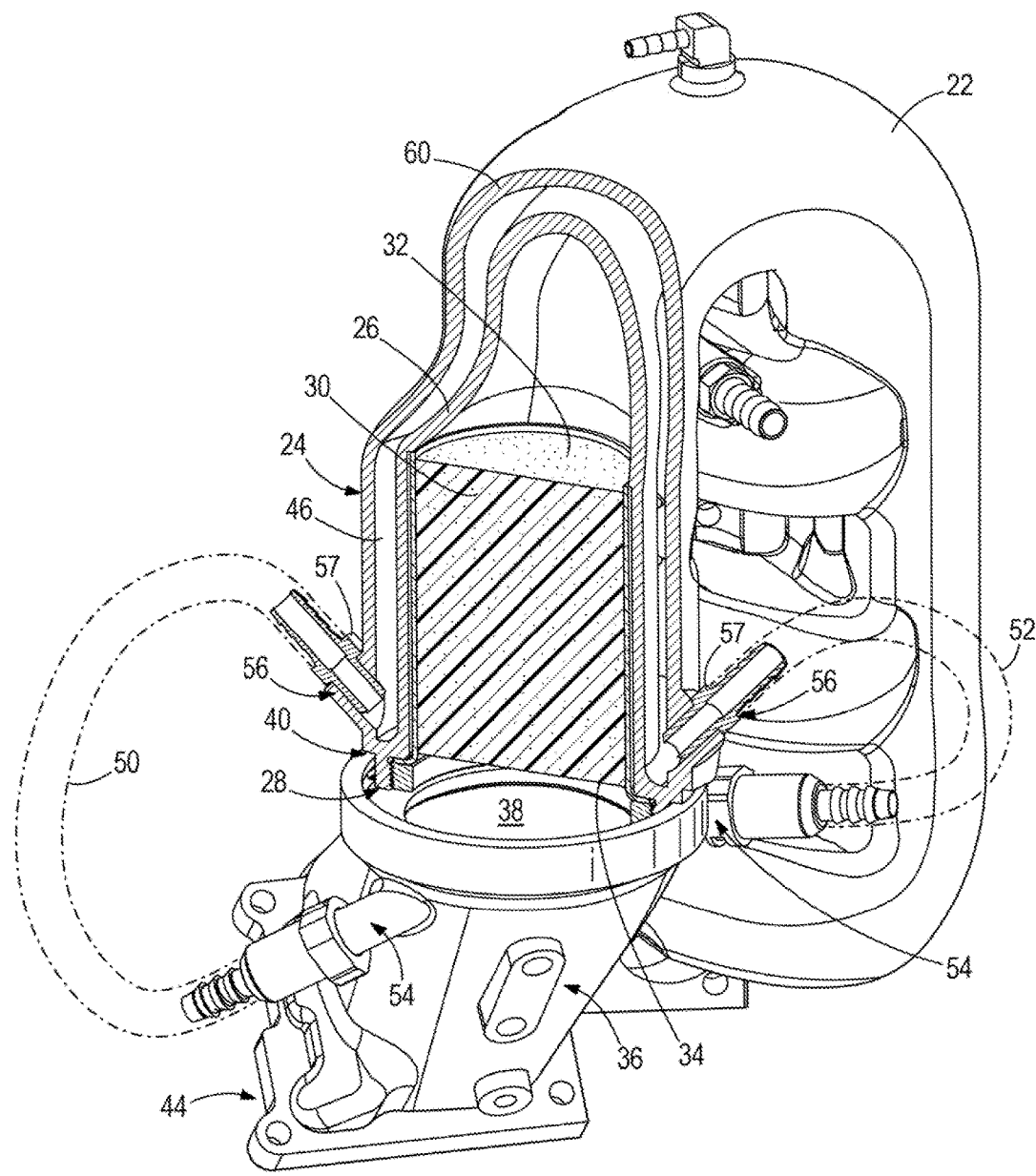
FIG. 4 is a perspective view, partially cutaway, of a catalyst housing for containing a catalyst for treating exhaust gas flow from the internal combustion engine.

Referring to FIG. 4, first and second bypass conduits 50, 52 each convey cooling water from the outlet collector cooling water jacket 48 to the catalyst housing cooling water jacket 46. The first and second bypass conduits 50, 52 bypass the joint 40 so that cooling water does not flow along the noted radially outer periphery of the joint 40. Each of the first and second bypass conduits 50, 52 has a first end 54 connected to the outlet collector cooling water jacket 48 and a second end 56 connected to the catalyst housing cooling water jacket 46. In the illustrated example, the second ends 56 are tangentially connected to the catalyst housing cooling water jacket 46 at fittings 57 so that cooling water is tangentially introduced to the catalyst housing cooling water jacket 46 to form a helical flow around the catalyst housing 24 and catalyst 30. The second ends 56 are connected to the catalyst housing cooling water jacket 46 adjacent the joint 40 and seal 42 and angled towards the joint 40 and seal 42 so that cooling water flow is directed towards and adjacent to the seal 42 at the joint 40. In the illustrated example, the first and second bypass conduits 50, 52 are located on opposite sides of the catalyst housing 24. The number and configuration of the bypass conduits can vary from that which is shown.

As shown in FIG. 3, a cooling water pump 58 is configured to pump cooling water from the body of water in which the outboard marine propulsion device 10 is operating from upstream to downstream in series through the outlet collector cooling water jacket 48, the first and second bypass conduits 50, 52, and the catalyst housing cooling water jacket 46. Thereafter, the cooling water flows through a cooling water jacket 60 on the exhaust manifold 22.

Figure 5:
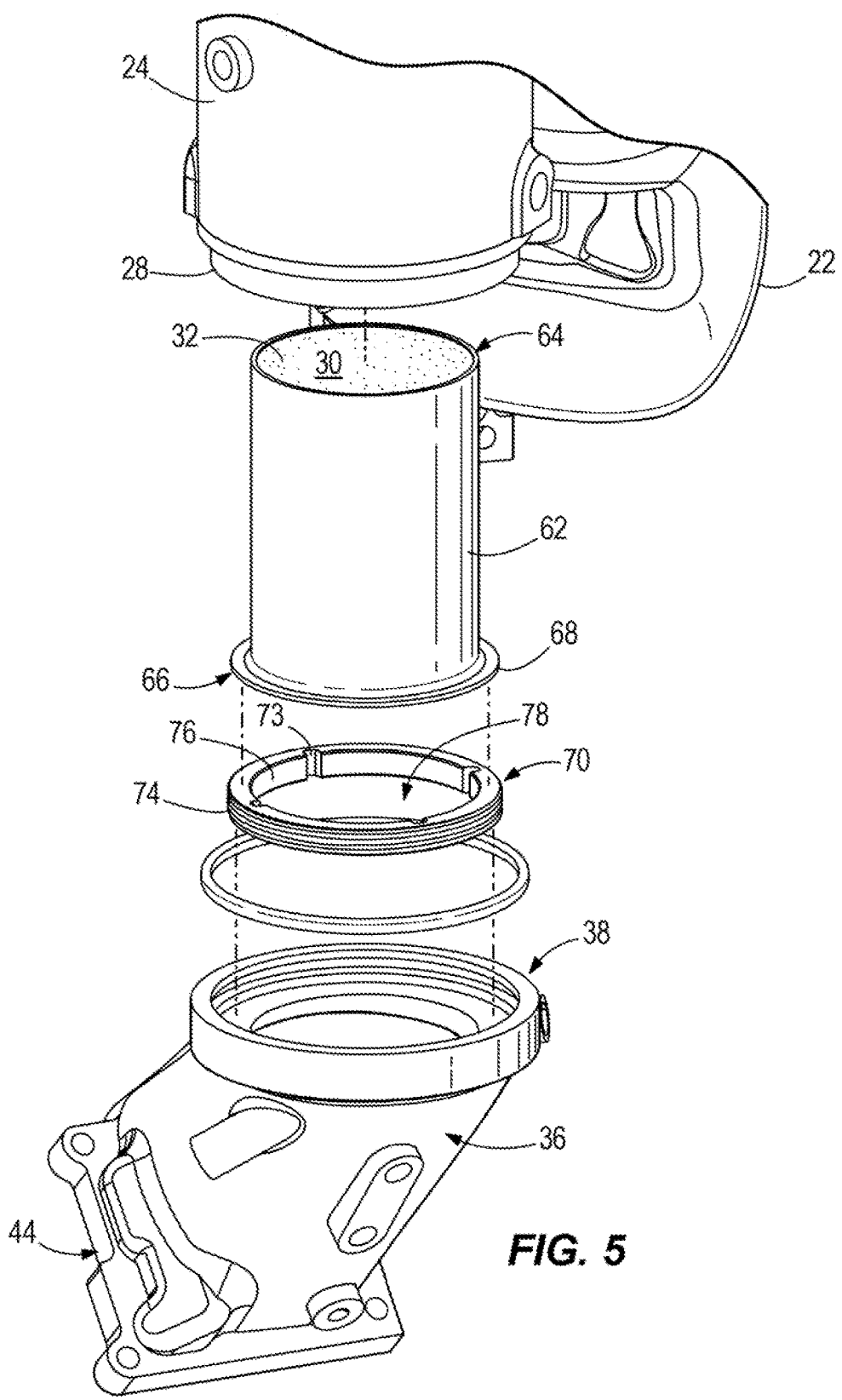
FIG. 5 is an exploded view of the catalyst housing, a catalyst, an outlet collector, and a connector that retains the catalyst in the catalyst housing.
Figure 6:
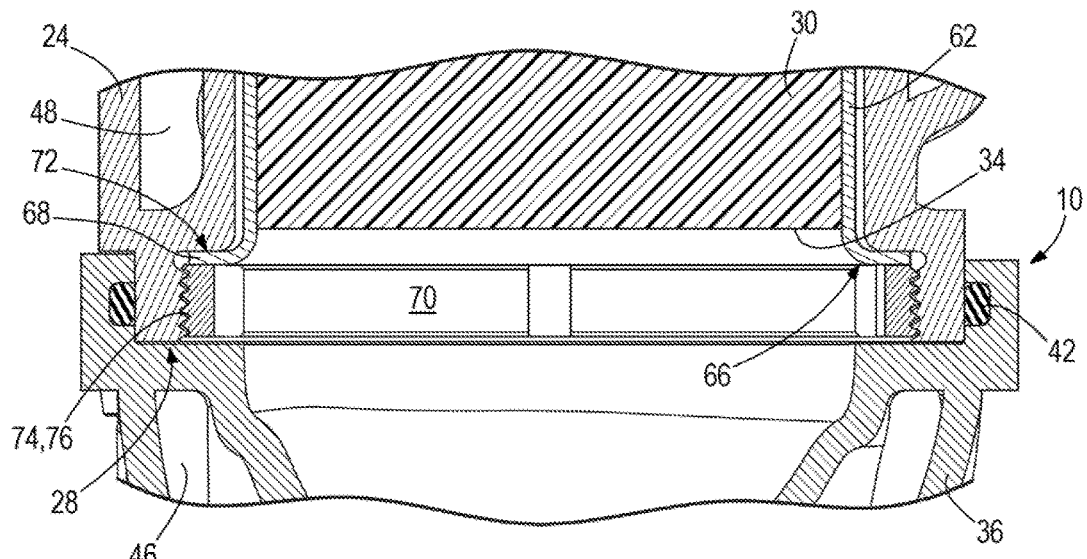
FIG. 6 is a sectional view of the catalyst housing, catalyst, outlet collector and connector.

Referring now to FIGS. 5 and 6, the catalyst 30 has a catalyst "can" or mantel 62 on the circumferential outer periphery of the catalyst 30. The catalyst mantel 62 has a mantel inlet end 64 and an opposite, mantel outlet end 66. A radial flange 68 is disposed on the mantel outlet end 66 and radially extends from the outer periphery of the mantel outlet end 66. A connector 70 is configured to mate with the inner diameter of the catalyst housing 24 at the housing outlet end 28 in such a manner that the radial flange 68 of the catalyst mantel 62 is sandwiched between the connector 70 and a radially inwardly extending, shoulder 72 of the catalyst housing 24.

In the illustrated example, the connector 70 has a threaded radially outer peripheral surface 74 that engages with a threaded radially inner peripheral surface 76 on the catalyst housing 24. Rotating the connector 70 in one direction with respect to the catalyst housing 24 moves the connector 70 towards the radially inwardly extending shoulder 72 of the catalyst housing 24 and clamps the radial flange 68 between the connector 70 and the radially inwardly extending shoulder 72. Rotating the connector 70 in an opposite direction with respect to the catalyst housing 24 moves the connector 70 away from the radially inwardly extending shoulder 72 of the catalyst housing 24 and releases the radial flange 68 from the connector 70 and the radially inner shoulder 72. Continued rotation allows for removal of the connector 70 from the catalyst housing 24 so that the catalyst 30 can also be removed from the catalyst housing 24, as shown in FIG. 5.

In the illustrated example, the threaded radially inner peripheral surface 76 of the catalyst housing 24 is located, at an open end (i.e. housing outlet end 28) of catalyst housing 24. The connector 70 is in the shape of a ring having an inner passageway 78 that allows exhaust gas flow therethrough. Notches 73 are provided along the inner radius for engagement with a tool to manually or mechanically rotate the connector 70. The inner passageway 78 has a radially inner diameter that is equal to or larger than a radial diameter of the catalyst outlet end 34 so that the connector 70 does not restrict the exhaust gas flow therethrough/therepast. In one example, the connector 70 can be made of brass and the catalyst housing 24 can be made of aluminum so that the connector 70 and catalyst housing 24 undergo similar thermal expansion and contraction during changes of temperature.

The catalyst inlet end 32 and the mantel inlet end 64 are separated from the catalyst housing 24 so that the catalyst inlet end 32 and mantel inlet end 64 are free to thermally expand and contract due to changes in temperature in the exhaust system. The seal 42 that is disposed between the collector inlet end 38 and the housing outlet end 28 radially overlaps with the connector 70, as shown in FIG. 6. As explained herein above, the collector inlet end 38 and housing outlet end 28 are devoid of a cooling jacket.

The present disclosure thus provides methods of assembling an exhaust system for an outboard marine propulsion device 10 having an internal combustion engine 12. In certain examples, the methods can include providing a catalyst housing 24 having a housing inlet end 26 that receives an exhaust gas flow from the internal combustion engine into the catalyst housing 24 and an opposite, housing outlet end 28 that discharges the exhaust gas flow out of the catalyst housing 24. The methods can further include disposing a catalyst 30 in the catalyst housing 24, the catalyst 30 having a catalyst inlet end 32 that receives the exhaust gas flow and an opposite, catalyst outlet end 34 that discharges the exhaust flow. A catalyst mantel 62 can be disposed an an outer periphery of the catalyst 30. The catalyst mantel 62 has a mantel inlet end 64 and an opposite mantel outlet end 66. A radial flange 68 is on the mantel outlet end 66. The method further can include mating a connector 70 with an inner diameter of the catalyst housing 24 such that the radial flange 68 of the catalyst mantel 62 is sandwiched between the connector 70 and a radially inwardly extending shoulder 72 of the catalyst housing 24. An outlet collector 36 can be provided that receives the exhaust gas flow from the housing outlet end 28. The method can include engaging a collector inlet end 38 of the outlet collector 36 with the housing outlet end 28 so that the collector inlet end 38 overlaps with the housing outlet end 28, with a seal being disposed between the collector inlet end 38 and the housing outlet end 28.

Through research and development, the present inventors have endeavored to provide improved cooling systems and exhaust systems for outboard marine propulsion devices. The present inventors have determined that outboard marine propulsion devices preferably are water cooled to keep metal temperatures low. A common method of doing this is water-jacketing the exhaust manifold and other passages. However cooling water jackets have been found by the present inventors to disadvantageously take up additional space and cause sealing challenges at gasketed joints. Since gasketed joints require additional space for gaskets and fasteners, the packaging impact of water jacketed exhaust passages has been found most challenging at gasketed joints.

Figure 7:
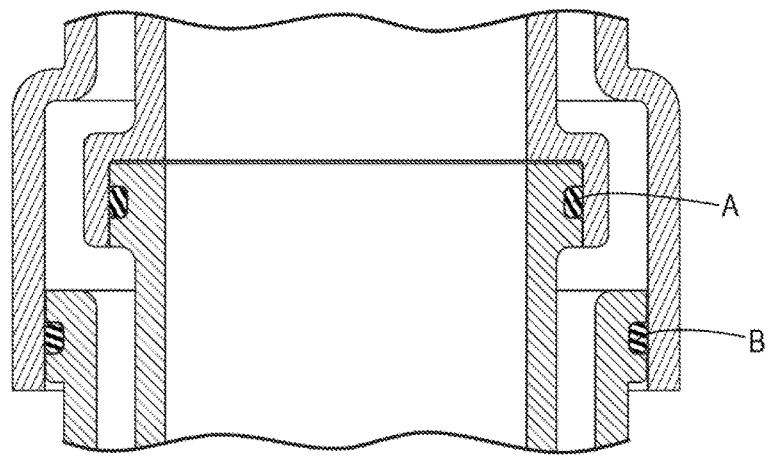
FIG. 7 is a sectional view of a prior art catalyst housing and outlet collector.

FIG. 7 depicts a conventional manner in which exhaust joints are water cooled. Two O-rings A, B are utilized, O-ring A seals the exhaust conduits and O-ring B seals the water jackets. Radially sealing O-ring joints typically are tolerant of axial movement of the joint e.g. movement due to tolerances, thermal growth, or vibration). Radially sealing O-rings are also slightly forgiving of angular misalignments and eccentricity. The present inventors have found that this two O-ring design is a robust joint, but is not a compact design.

The present inventors have also endeavored to provide a more compact arrangement without interfering with surrounding components of the outboard marine propulsion device 10 including the exhaust runners, cowl and spark plugs. Through research and development, it was found that a face seal would fit in the requisite packaging space, but would not provide the tolerance to axial and angular misalignment that was needed for a robust joint. The present inventors developed the presently illustrated solution that includes a single O-ring joint, where the O-ring only seals the exhaust. To avoid overheating of the materials including the aluminum castings, silicone O-ring, water is plumbed via the first and second bypass conduits 50, 52 directly above and below the single O-ring.

The present inventors have also found a drawback of O-ring joints, including the fact that they must be circular, which limits design flexibility. To use a conventional two O-ring joint (shown in FIG. 7), the outer O-ring would need to be large enough to allow water to pass between it and the exhaust passages, but at that size it would interfere in the areas explained herein above. By not using the outer O-ring and externally plumbing the water, design freedom was afforded to place the plumbing only where there was available space.

As FIGS. 1-6 show, the single O-ring advantageously does not make the joint any larger than the adjacent areas. The externally plumbed water adequately cools the metal and O-rings. To help assure proper cooling, the water that reenters the system can be supplied in tangential to the water jacket, therefore creating good circular flow adjacent to the O-ring. The cooling water flows upstream to downstream up the lower collector, through the externally plumbed water hoses, and into the manifold cooling jacket.

The embodiment shown in the drawings depicts the joint 40 located between the collector inlet end 38 and the housing outlet end 28; however the concepts of the present disclosure are not so limited. For example, the joint 40 can be located at the housing inlet end 26 and be formed between a downstream engagement end of an exhaust conduit, for example of the exhaust manifold 22. Just like the arrangement shown in the drawings, this example would include a joint that is devoid of a cooling water jacket and provide the same advantages described herein above.

The present disclosure thus contemplates exhaust systems for a marine propulsion device 10 having an internal combustion engine 12. The exhaust systems can include a catalyst housing 24 having a housing inlet end 26 that receives an exhaust flow from the internal combustion engine 12 and an opposite housing outlet end 28 that discharges the exhaust flow. A catalyst 30 is disposed in the catalyst housing 24. An exhaust conduit, which can be a member of the exhaust manifold 22 or an outlet collector 36 that receives the exhaust flow from the catalyst housing 24, conveys exhaust gases to the catalyst housing 24 or from the catalyst housing 24. The exhaust conduit includes an engagement end, for example collector inlet end 38, that is engaged with the catalyst housing 24 in such a manner that one of the engagement end and the catalyst housing 24 overlaps the other of the engagement end and the catalyst housing 24 at a joint, for example joint 40. A seal, such as the O-ring seal 42 is disposed at the joint between the engagement end and the catalyst housing 24. The joint, as mentioned herein above, can be devoid of a cooling water jacket.

Besides the packaging benefits, this arrangement has also been found by the present inventors to provide advantages over the conventional two O-ring joint design shown in FIG. 7, including no water to exhaust leak path if the O-ring fails or gets damaged, and no water boiling in tight clearances around the exhaust O-ring, therefore limiting corrosion.

In the illustrated example, the catalyst 30 is installed in the catalyst housing 24 on the exhaust manifold 22. The catalyst 30 is installed axially into the catalyst housing 24 retained via the connector 70, which in the illustrated example is a large diameter externally threaded nut (i.e. spanner nut). This arrangement could also work if the catalyst 30 was retained in a different component, such as if the catalyst housing 24 were integral with the cylinder head 20 or engine block 18. Advantageously, this example allows for thermal expansion of the catalyst 30 and mantel 62 at the inlet end, and securely retains the catalyst 30 and mantel 62 at the outlet end. The connector allows for easy assembly and disassembly from the catalyst housing.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. In alternate examples, the radial flange 68 of the catalyst mantel 62 can be located on the mantel inlet end 64 instead of the mantel outlet end 66. In such examples, the connector 70 can be configured to mate with the upstream catalyst housing inlet end 26 instead of the downstream, catalyst housing outlet end 28. This embodiment allows for installation of the catalyst housing inlet end 26 prior to attachment to the exhaust manifold 22.

What is claimed is:

1. An exhaust system for a marine propulsion device having an internal combustion engine, the exhaust system comprising:
    a catalyst housing having a housing inlet end that receives an exhaust gas flow from the internal combustion engine and an opposite, housing outlet end that discharges the exhaust gas flow;
    a catalyst disposed in the catalyst housing;
    an outlet collector that receives the exhaust gas flow from the catalyst housing, wherein the outlet collector comprises a collector inlet end that is engaged with the housing outlet end such that one of the collector inlet end and housing outlet end overlaps with the other of the collector inlet end and housing outlet end at a joint; and
    a seal disposed at the joint between the collector inlet end and the housing outlet end;
    wherein the joint is devoid of a cooling water jacket.

2. The exhaust system according to claim 1, further comprising a catalyst housing cooling water jacket disposed on the catalyst housing.

3. The exhaust system according to claim 1, further comprising an outlet collector cooling water jacket disposed on the outlet collector.

4. The exhaust system according to claim 1, wherein the collector inlet end has a radially inner diameter that is larger than a radially outer diameter of the housing outlet end and wherein the collector inlet end overlaps the housing outlet end at the joint.

5. The exhaust system according to claim 1, wherein the catalyst has an upstream catalyst inlet end that receives the exhaust gas flow and an opposite, downstream catalyst outlet end that discharges the exhaust gas flow, and wherein the catalyst outlet end is located upstream of the joint.

6. The exhaust system according to claim 1, further comprising an outlet collector cooling water jacket on the outlet collector, a catalyst housing cooling water jacket on the catalyst housing, and at least one bypass conduit that conveys cooling water from one of the outlet collector cooling water jacket catalyst and catalyst housing cooling water jacket to the other of the outlet collector cooling water jacket and catalyst housing cooling water jacket.

7. The exhaust system according to claim 6, wherein the at least one bypass conduit bypasses the joint so that cooling water does not flow along a radially outer periphery of the joint.

8. The exhaust system according to claim 6, wherein the at least one bypass conduit comprises a first end connected to the outlet collector cooling water jacket and a second end connected to the catalyst housing cooling water jacket.

9. The exhaust system according to claim 8, wherein at least one of the first and second ends are tangentially connected to one of the respective outlet collector cooling water jacket and catalyst housing cooling water jacket so that cooling water is introduced to the one of the respective outlet collector cooling water jacket and catalyst housing cooling water jacket in a helical water flow.

10. The exhaust system according to claim 8, wherein the at least one of the first and second ends is connected to the one of the respective outlet collector cooling water jacket and catalyst housing cooling water jacket adjacent the joint, so that the water helical flow is adjacent the seal.

11. The exhaust system according to claim 8, wherein the at least one bypass conduit comprises a first bypass conduit and a second bypass conduit that are located on opposite sides of the catalyst housing.

12. The exhaust system according to claim 1, wherein the outlet collector comprises a collector outlet end that discharges exhaust gases.

13. The exhaust system according to claim 12, wherein the collector outlet end discharges exhaust gases to a cylinder block of the internal combustion engine.

14. An exhaust system for a marine propulsion device having an internal combustion engine, the exhaust system comprising:
    a catalyst housing having a housing inlet end that receives an exhaust gas flow from the internal combustion engine and an opposite, housing outlet end that discharges the exhaust gas flow;
    a catalyst disposed in the catalyst housing;
    an outlet collector that receives the exhaust gas flow from the catalyst housing, wherein the outlet collector comprises a collector inlet end that is engaged with the housing outlet end, wherein one of the collector inlet end and housing outlet end overlaps with the other of the collector inlet end and housing outlet end at a joint; and
    a seal disposed at the joint between the collector inlet end and the housing outlet end;
    an outlet collector cooling water jacket on the outlet collector, a catalyst housing cooling water jacket on the catalyst housing, and at least one bypass conduit that conveys cooling water from one of the outlet collector cooling water jacket and catalyst housing cooling water jacket to the other of the outlet collector cooling water jacket and catalyst housing cooling water jacket;
    wherein the at least one bypass conduit bypasses the joint so that cooling water does not flow along a radially outer periphery of the joint; and
    a cooling water pump that pumps cooling water from upstream to downstream through the outlet collector cooling water jacket, at least one bypass conduit, and catalyst housing cooling water jacket.

15. The exhaust system according to claim 14, wherein the cooling water pump pumps the cooling water in series through the outlet collector cooling water jacket, the at least one bypass conduit and then the catalyst housing cooling water jacket.

16. The exhaust system according to claim 15, wherein the at least one bypass conduit comprises a first end connected to the outlet collector cooling water jacket and a second end connected to the catalyst housing cooling water jacket.

17. The exhaust system according to claim 16, wherein at least one of the first and second ends are tangentially connected to one of the respective outlet collector cooling water jacket and catalyst housing cooling water jacket so that cooling water is introduced to the one of the respective outlet collector cooling water jacket and catalyst housing cooling water jacket in a helical flow.

18. The exhaust system according to claim 17, wherein the at least one of the first and second ends is connected to the one of the respective outlet collector cooling water jacket and catalyst housing cooling water jacket adjacent the seal so that the helical flow is adjacent the seal.

19. The exhaust system according to claim 14, wherein the outlet collector comprises a collector outlet end that discharges exhaust gases.

20. The exhaust system according to claim 19, wherein the collector outlet end discharges exhaust gases to a cylinder block of the internal combustion engine.

21. An exhaust system for a marine propulsion device having an internal combustion engine, the exhaust system comprising:
    a catalyst housing having a housing inlet end that receives an exhaust gas flow from the internal combustion engine and an opposite, housing outlet end that discharges the exhaust gas flow;
    a catalyst disposed in the catalyst housing;
    an exhaust conduit that conveys exhaust gases to the catalyst housing or from the catalyst housing;
    wherein the exhaust conduit comprises an engagement end that is engaged with the catalyst housing, wherein one of the engagement end and the catalyst housing overlaps the other of the engagement end and the catalyst housing at a joint; and
    a seal disposed at the joint between the engagement end and the catalyst housing;
    wherein the joint is devoid of a cooling water jacket.

22. The exhaust system according to claim 21, wherein the exhaust conduit comprises an outlet collector that receives the exhaust gas flow from the catalyst housing, and wherein the engagement end comprises a collector inlet end of the outlet collector.

23. The exhaust system according to claim 22, further comprising an outlet collector cooling water jacket on the outlet collector, a catalyst housing cooling water jacket on the catalyst housing, and at least one bypass conduit that conveys cooling, water from one of the outlet collector cooling water jacket catalyst and catalyst housing cooling water jacket to the other of the outlet collector cooling water jacket and catalyst housing cooling water jacket.

* * * * *